(12) United States Patent
Fournier et al.

(10) Patent No.: US 10,145,730 B2
(45) Date of Patent: Dec. 4, 2018

(54) TESTING DEVICE FOR LASER ILLUMINATION SYSTEMS

(71) Applicant: APPLE INC., Cupertino, CA (US)

(72) Inventors: Florian R. Fournier, Cupertino, CA (US); Miodrag Scepanovic, San Jose, CA (US)

(73) Assignee: APPLE INC., Cupertino, CA (US)

( * ) Notice: Subject to any disclaimer, the term of this patent is extended or adjusted under 35 U.S.C. 154(b) by 384 days.

(21) Appl. No.: 14/975,889

(22) Filed: Dec. 21, 2015

(65) Prior Publication Data

US 2017/0176249 A1 Jun. 22, 2017

(51) Int. Cl.
  *G01J 1/42* (2006.01)
  *G02B 27/42* (2006.01)
  *G02B 5/02* (2006.01)

(52) U.S. Cl.
  CPC ............ *G01J 1/4257* (2013.01); *G02B 5/021* (2013.01); *G02B 27/4233* (2013.01)

(58) Field of Classification Search
  CPC ............... G02B 27/42; G02B 27/4205; G02B 27/4222; G02B 27/4227; G02B 27/4233; G02B 27/425; G02B 27/44; G02B 5/02; G02B 5/021; G02B 5/0273; G02B 5/0278; G02B 5/0289; G02B 5/0294; G01J 1/4257; G01J 1/42; G01J 1/04; G01J 1/0407; G01M 11/02; G01M 11/0207; H01S 3/0014
  See application file for complete search history.

(56) References Cited

U.S. PATENT DOCUMENTS

| 7,262,915 | B2* | 8/2007 | Kleemann | G02B 5/1838 |
| | | | | 359/565 |
| 8,384,997 | B2 | 2/2013 | Shpunt et al. | |
| 8,492,696 | B2 | 7/2013 | Akerman et al. | |
| 9,528,906 | B1* | 12/2016 | Yasovsky | G01M 11/0207 |
| 9,829,445 | B2* | 11/2017 | Nawasra | G01N 21/958 |
| 2014/0268792 | A1* | 9/2014 | Schnobrich | F21K 9/50 |
| | | | | 362/285 |
| 2017/0160209 | A1* | 6/2017 | Nawasra | G01N 21/958 |
| 2017/0176249 | A1* | 6/2017 | Fournier | G01J 1/4257 |

OTHER PUBLICATIONS

Yasovsky et al., U.S. Appl. No. 14/548,476, filed Nov. 20, 2014.

* cited by examiner

*Primary Examiner* — John Lee
(74) *Attorney, Agent, or Firm* — D. Kligler IP Services Ltd.

(57) ABSTRACT

Apparatus and methods are described, including an apparatus for testing a light beam emitted by a light source. The apparatus includes a transparent substrate, a first face of the substrate being shaped to define a plurality of optical deflectors. At least one optical detector is positioned to face a second face of the substrate that is not opposite the first face. Each one of the deflectors is configured to deflect a portion of the light beam toward the detector, when the light beam is passed through the first face of the substrate. Other applications are also described.

20 Claims, 3 Drawing Sheets

TESTING DEVICE FOR LASER ILLUMINATION SYSTEMS

FIELD OF THE DISCLOSURE

Embodiments described herein relate to testing a light beam that is used, for example, for optical 3D mapping or for illumination.

BACKGROUND

In some applications, the angular spread of a light beam is increased (i.e., the light beam is expanded), e.g., by being diffused or diffracted.

SUMMARY

Embodiments described herein include an apparatus for testing a light beam emitted by a light source. The apparatus includes a transparent substrate, a first face of the substrate being shaped to define a plurality of optical deflectors. The apparatus further includes at least one optical detector positioned to face a second face of the substrate that is not opposite the first face. Each one of the deflectors is configured to deflect a portion of the light beam toward the detector, when the light beam is passed through the first face of the substrate.

In some embodiments, the optical detector is coupled to the second face of the substrate.

In some embodiments, the first face of the substrate is shaped to define the plurality of optical deflectors by being shaped to define a plurality of prism-shaped indentations.

In some embodiments, the first face of the substrate is shaped to define the plurality of optical deflectors by being shaped to define a plurality of pyramid-shaped indentations.

In some embodiments, the apparatus further includes the light source.

In some embodiments, the substrate is shaped to define a flat plate.

In some embodiments, the substrate is shaped to define a lens.

In some embodiments, a third face of the substrate that is opposite the first face is shaped to define a diffractive optical element.

In some embodiments, a third face of the substrate that is opposite the first face is a light-diffusing face.

In some embodiments, the apparatus further includes a diffractive optical element (DOE), and a third face of the substrate that is opposite the first face is coupled to the DOE.

In some embodiments, a first one of the deflectors is (i) farther from the detector than a second one of the deflectors, and (ii) larger than the second deflector.

In some embodiments, a first area of the first face is farther from the detector than a second area of the first face, and the deflectors are distributed more densely in the first area than in the second area.

In some embodiments, a length of each of the deflectors is between 10 and 200 micrometers.

In some embodiments, a width of each of the deflectors is between 10 and 200 micrometers.

In some embodiments, the optical detector is configured to generate a signal in response to detecting the deflected portion of the light beam, and the apparatus further includes a processor configured to:
  receive the signal, and
  in response to the signal, generate an output that is indicative of an angular spread of the light beam.

In some embodiments, the processor is further configured to, in response to a magnitude of the signal exceeding a threshold, inhibit operation of the light source.

Embodiments described herein further include an apparatus for testing a light beam emitted by a light source. The apparatus includes a transparent substrate, a first face of the substrate having a plurality of optical deflectors embedded therein. The apparatus further includes an optical detector positioned to face a second face of the substrate that is not opposite the first face. Each one of the deflectors is configured to deflect a portion of the light beam toward the detector, when the light beam is passed through the first face of the substrate.

Embodiments described herein further include a method for testing a light beam emitted by a light source. Using a light source, a light beam is passed through a first face of a transparent substrate, the first face of the substrate being shaped to define a plurality of optical deflectors. Using an optical detector positioned to face a second face of the substrate that is not opposite the first face, a portion of the light beam that is deflected by the deflectors is detected, and a signal is generated in response thereto. Using a processor, the signal is received, and in response to the signal, an output that is indicative of an angular spread of the light beam is generated.

In some embodiments, the method further includes using the processor to inhibit operation of the light source, in response to a magnitude of the signal exceeding a threshold.

Embodiments described herein further include a method for use with a transparent substrate having (i) a first face, and (ii) a second face that is not opposite the first face. An optical detector is positioned to face the second face of the substrate, and the first face of the substrate is shaped to define a plurality of optical deflectors. Each one of the deflectors is configured to deflect a portion of a light beam toward the detector, when the light beam is passed through the first face of the substrate.

In some embodiments, shaping the first face of the substrate to define the plurality of optical deflectors includes shaping the first face of the substrate to define a plurality of prism-shaped indentations.

In some embodiments, shaping the first face of the substrate to define the plurality of optical deflectors includes shaping the first face of the substrate to define a plurality of pyramid-shaped indentations.

In some embodiments, shaping the first face of the substrate to define the plurality of optical deflectors includes shaping the first face of the substrate to define a first deflector and a second deflector, the first deflector being (i) farther from the detector than the second deflector, and (ii) larger than the second deflector.

Embodiments described herein will be more fully understood from the following detailed description of embodiments thereof, taken together with the drawings, in which:

DETAILED DESCRIPTION OF EMBODIMENTS

Figure 1:
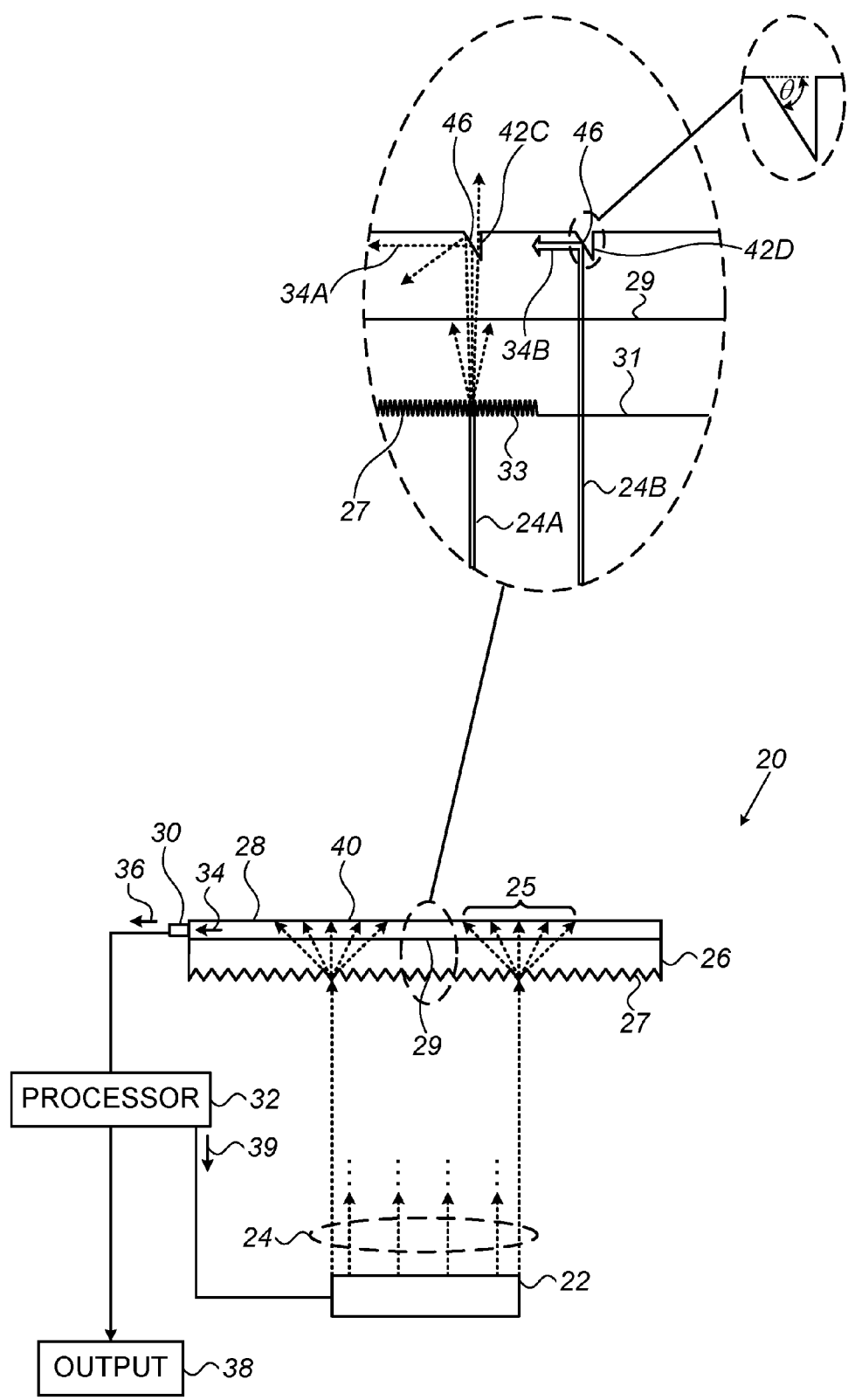
FIGS. 1-2 are schematic illustrations of an apparatus for testing a light beam, in accordance with some embodiments described herein.

The term "light," as used in the context of the present description and in the claims, refers to optical radiation in any of the visible, infrared, and ultraviolet ranges.

In many applications, the angular spread of a light beam is increased, e.g., by being diffracted or diffused. For example:

(i) Optical 3D mapping is the process of generating a 3D profile of the surface of an object by processing light reflected from the object. This sort of 3D profile is also referred to as a 3D map, 3D image, depth map or depth image, and 3D mapping is also referred to as depth mapping. Typically, an optical apparatus that includes a diffractive optical element (DOE) is used for depth mapping. The DOE increases the angular spread of a light beam, by generating multiple orders of diffraction of the light beam. The orders of diffraction are reflected from a surface at multiple points, the reflected light from each of the multiple points is detected, and the reflected light is used to compute a depth map of the surface. Such depth mapping may be applied to interactive video games. For example, a subject may interact with a game by making various gestures with his hand, and depth mapping may be used to identify the gestures.

(ii) In some imaging applications, diffuse illumination is provided, by using an optical apparatus that includes a diffuser. The diffuser increases the angular spread of the light beam by diffusing the light beam.

In the examples above, if the DOE does not properly diffract the light beam, or if the diffuser does not properly diffuse the light beam, the depth-mapping or illumination might not be effective, and/or portions of the optical apparatus through which the light beam passes may be damaged. Since various factors, such as age and humidity, may degrade the performance of the DOE or diffuser, it is important to continually test that the DOE or diffuser is working properly. Hence, embodiments described herein provide apparatus and methods for testing the angular spread of the light beam by the optical apparatus.

Although the present description and figures relate mainly to an optical apparatus that includes a DOE, it is noted that embodiments described herein may be practiced with any optical apparatus that increases the angular spread of a light beam. For example, the optical apparatus may include a diffuser, alternatively or additionally to including a DOE. (Thus, in general, a reference to "DOE" below may be substituted with a reference to "diffuser," and a reference to "diffraction" may be substituted with a reference to "diffusion.") Embodiments described herein may be combined with embodiments described in U.S. patent application Ser. No. 14/548,476, filed Nov. 20, 2014, whose disclosure is incorporated herein by reference.

In some embodiments, a transparent substrate is provided, a first face of the substrate being shaped to define a plurality of optical deflectors. An optical detector is positioned facing (e.g., coupled to) a second face of the substrate that is not opposite the first face. To test the light beam, the light beam is passed through the first face of the substrate. When the light beam is not properly diffracted, a larger-than-usual portion of the light beam is deflected by the deflectors toward the detector. In response to a signal generated by the detector, a processor may generate an output that is indicative of the angular spread of the light beam, and/or inhibit operation of the light source.

Reference is initially made to FIG. 1, which is a schematic illustration of an apparatus 20 for testing a light beam 24, in accordance with some embodiments described herein. As shown in FIG. 1, light beam 24 is emitted by a light source 22, comprising, for example, a laser diode, or an array of laser diodes, such as a vertical-cavity surface-emitting laser (VCSEL) array.

Light beam 24 is emitted toward a DOE 26. Typically, DOE 26 comprises a transparent substrate, such as glass or a suitable plastic, for example polycarbonate, with a grating 27 formed on one of its optical surfaces. For example, grating 27 may be formed on the entrance surface of DOE 26, facing light source 22. Grating 27 generates a pattern comprising multiple diffraction orders 25, which exit DOE 26 through an exit surface 29. The gratings may be configured, for example, to generate multiple, adjacent instances of a pattern of spots, as described in U.S. Pat. No. 8,384,997, whose disclosure is incorporated herein by reference. Such patterns are useful particularly in 3D mapping (in association with an imaging assembly), as described in U.S. Pat. No. 8,384,997 and in U.S. Pat. No. 8,492,696, whose disclosure is likewise incorporated herein by reference.

As shown in FIG. 1, a transparent substrate 28 is disposed near exit surface 29 of DOE 26. Substrate 28 may be coupled (e.g., glued) to exit surface 29, or alternatively, disposed at a distance from exit surface 29, such that an air gap interposes between substrate 28 and exit surface 29.

FIG. 1 shows a side view of substrate 28, in which a first face 40 of the substrate is facing upward. As further described hereinbelow with reference to FIG. 2, first face 40 is shaped to define a plurality of optical deflectors 42. Deflectors 42 deflect a portion 34 of light beam 24 toward an optical detector 30, comprising, for example, a silicon photodiode. Optical detector 30 generates a signal 36 in response to detecting deflected portion 34 of the light beam. A processor 32 receives signal 36, and, in response to signal 36, generates an output 38 (e.g., a visual and/or auditory output) that is indicative of the angular spread of the light beam. Alternatively or additionally, the processor may, in response to the magnitude of signal 36 exceeding a threshold, inhibit operation of the light source, by sending a control signal 39 to the light source.

In the present description and claims, substrate 28 is described and claimed as being "transparent," in that, with the exception of portion 34 of the light beam that is deflected toward detector 30, a negligible portion (e.g., less than 10%, or typically less than 1%) of light beam 24 is absorbed as it passes through the substrate. In other words, were no deflectors present in the substrate, the substrate would attenuate the light beam by only a small amount, e.g., by less than 1% or 0.1%. (Due to the deflectors, however, a lesser amount of light—for example, only 90%-99% of the light beam—may actually pass through the substrate. In general, apparatus 20 is configured such that the amount of deflected light is sufficient for detection by the detector, yet is not large enough to impede the functioning of the optical system.)

In some embodiments, as shown in FIG. 1, first face 40 faces away from the DOE. In other embodiments, first face 40 faces the DOE, e.g., first face 40 may be coupled to the DOE. In yet other embodiments, the face of the substrate that is opposite first face 40 is shaped to define the DOE. In other words, in such embodiments, DOE 26 and substrate 28 are not two separate elements, but rather, are merged together as a single element, such that the exit surface of the DOE is identical to first face 40 of the substrate. (Similarly, for applications in which light is diffused, the face of the substrate that is opposite first face 40 may be a light-diffusing face.)

The enlarged portion of FIG. 1, which shows more detail relating to the optical deflectors, is described hereinbelow.

Figure 2:
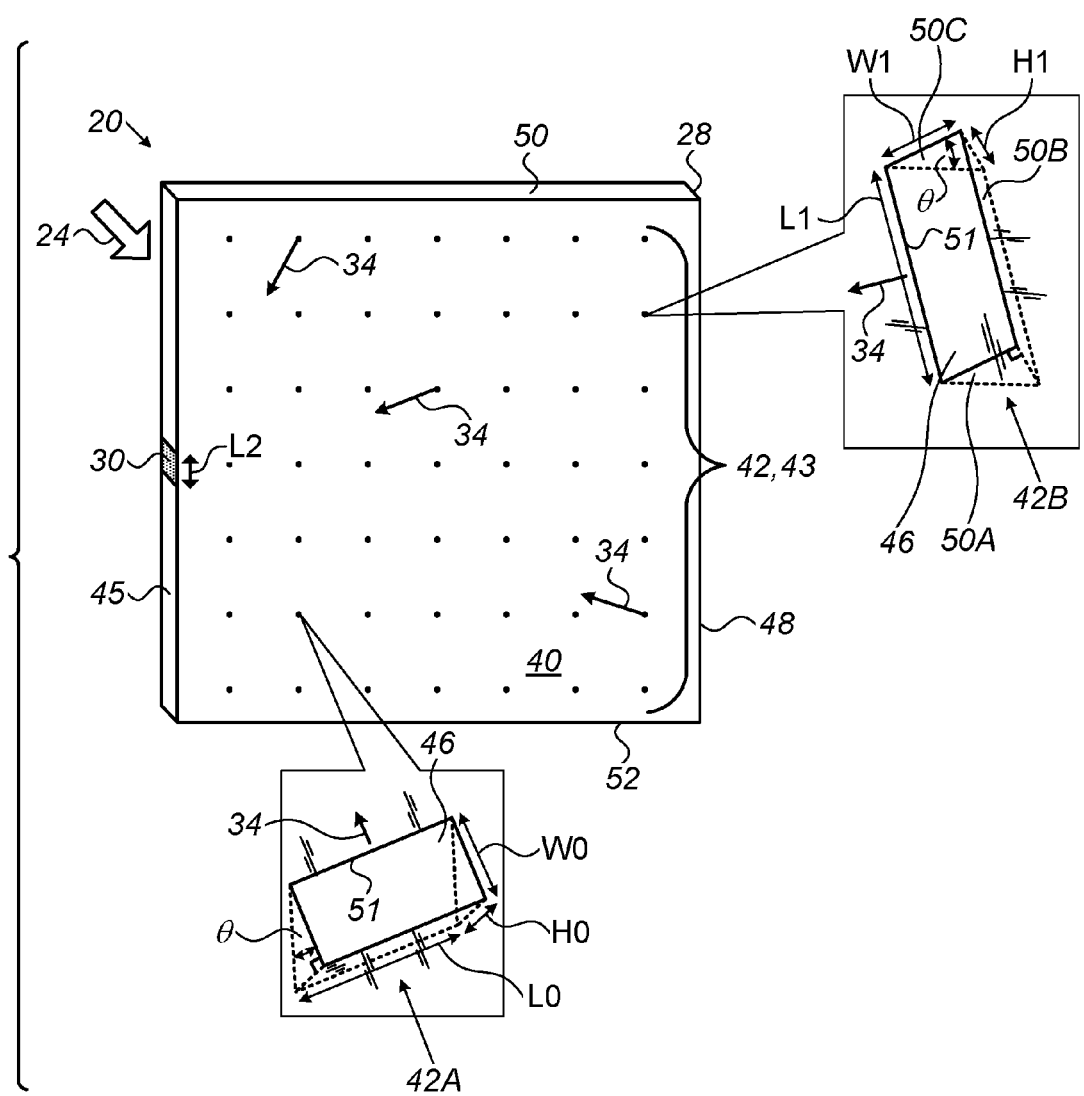
Figure 3:
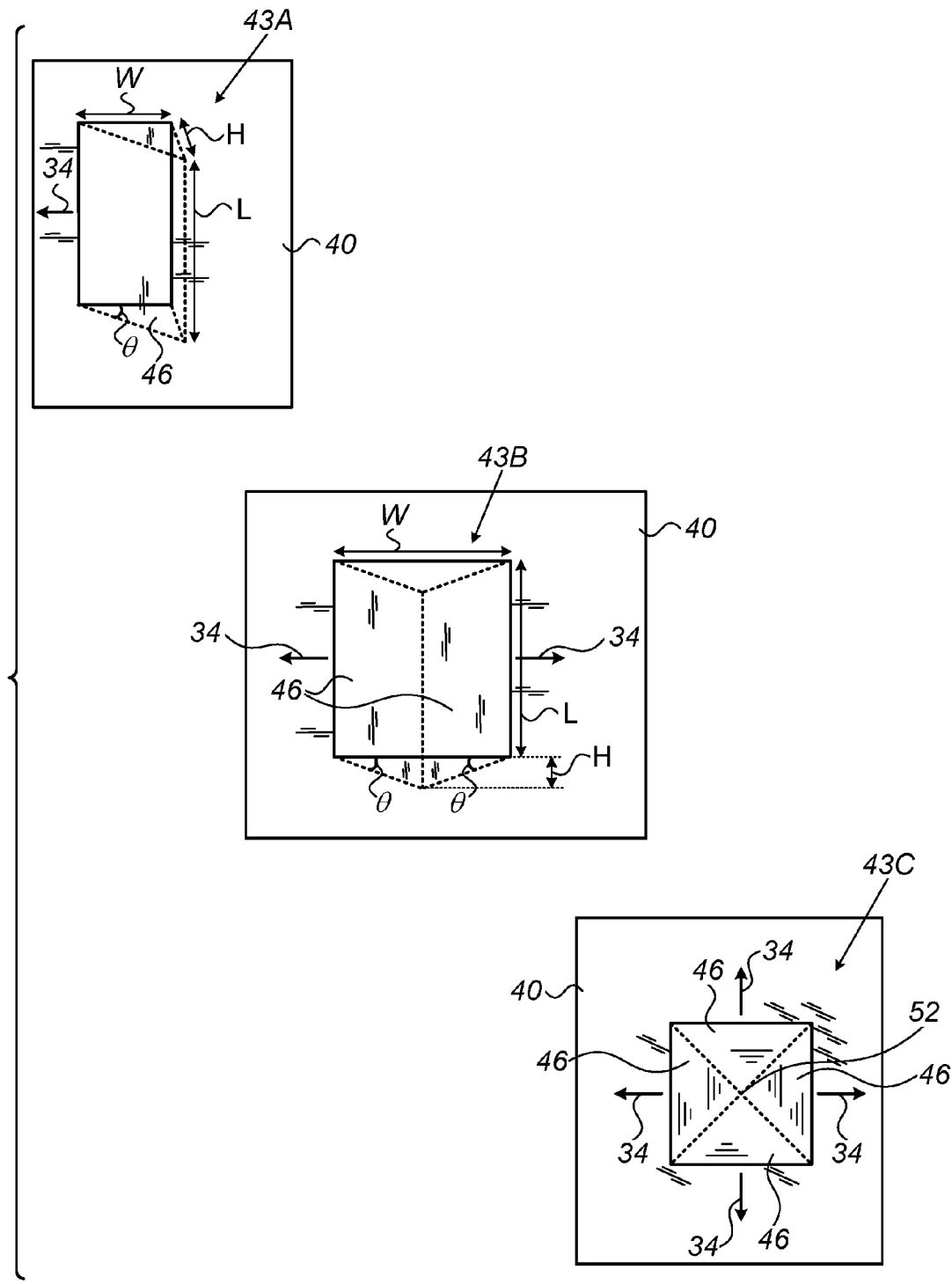
FIG. 3 is a schematic illustration of prism-shaped or pyramid-shaped indentations, in accordance with some embodiments described herein.

Reference is now additionally made to FIG. 2, which is a schematic illustration of apparatus 20, in accordance with some embodiments described herein, and to FIG. 3, which is a schematic illustration of prism-shaped or pyramid-shaped indentations 43, in accordance with some embodiments described herein.

FIG. 2 shows a head-on view of substrate 28. (With reference to FIG. 1, the view shown in FIG. 2 would be obtained by standing "above" substrate 28 and looking toward light source 22. Thus, FIG. 2 shows light beam 24 coming "out of the page" from behind substrate 28.) Substrate 28 typically has six faces: first face 40, a face (not shown) that is opposite first face 40, and four "perimeter faces" 45, 48, 50, and 52 that are not opposite the first face. (Typically, perimeter faces 45, 48, 50, and 52 are substantially perpendicular to first face 40.)

First face 40 is shaped to define a plurality of optical deflectors 42, such as the prism-shaped or pyramid-shaped indentations 43 shown in FIGS. 2-3. Typically, deflectors 42 are generally distributed (not necessarily uniformly) over a large portion (e.g., the entirety) of first face 40. One or more optical detectors 30 are positioned to face (e.g., are coupled to) one or more of the perimeter faces of the substrate. Each of the deflectors is shaped to define at least one deflecting face 46, which deflects a portion of the light beam toward one of the optical detectors, when the light beam is passed through first face 40.

For each of the indentations that are shown in FIGS. 2-3, the solid lines delineate an opening in the outer surface of the first face that defines the "base" of the indentation, while the dotted lines delineate surfaces that bound the indentation. For example, for each of the two prism-shaped indentations shown in FIG. 2, the solid lines delineate a generally rectangular opening in the outer surface of the first face, while the dotted lines delineate four surfaces below the outer surface: three surfaces 50A, 50B, and 50C that are generally perpendicular to the outer surface of the first face, and deflecting face 46. (The "right angle" symbols are added to FIG. 2 for clarity.)

To facilitate the deflection of the light beam toward a perimeter face of the substrate, the angle theta (shown in all of the figures) between deflecting face 46 and the outer surface of first face 40 is at least 40 and/or less than 50 degrees, and typically is around 45 degrees. In general, the value of angle theta is such that light that is incident on face 46 is reflected within the substrate by total internal reflection. For example, the critical angle of incidence for the substrate-air interface at face 46 may be less than 45 degrees, such that, if theta is 45 degrees, light reaches face 46 with an angle of incidence that is greater that the critical angle. (In particular, if theta is 45 degrees, the angle of incidence is 45 degrees.)

In some embodiments, a reflective coating is applied to deflecting face 46, e.g., if total internal reflection cannot otherwise be achieved.

FIG. 3 shows several examples of indentations 43:
(i) Indentation 43A is a substantially right-angle-triangular-prism-shaped indentation having a single deflecting face 46. The height (i.e., depth) H of indentation 43A is approximately equal to width W. Deflecting face 46 of indentation 43A deflects portion 34 of the light beam toward one of the perimeter faces of substrate 28. FIG. 2 shows an embodiment in which first face 40 is shaped to define a plurality of such indentations, each of the indentations being oriented such as to generally maximize the amount of deflected light that is detected by detector 30. In particular, each of the indentations is oriented such that the normal to the edge 51 of the indentation's deflecting face that lies on the outer surface of first face 40 points along the outer surface of the first face, "directly" toward the detector. Stated differently, if a line were to be drawn perpendicularly to edge 51 (generally in the direction of arrow "34") along the outer surface of first face 40, the line would pass through, or reach an edge of, the detector.

In some embodiments, apparatus 20 comprises more than one detector; for example, a first detector may be disposed at face 45, and a second detector at face 48. In such embodiments, each indentation 43A may be oriented such that deflecting face 46 of the indentation deflects light "directly" toward the detector that is closest to the indentation.

(ii) Indentation 43B is a substantially isosceles-triangular-prism-shaped indentation having two deflecting faces 46, which deflect a portion of the light beam toward two perimeter faces of the substrate. For example, if two optical detectors are at faces 45 and 48, respectively, the two deflecting faces may deflect light toward the two detectors. The height H of indentation 43B is approximately equal to half of width W of indentation 43B.

(iii) Indentation 43C is a pyramidal indentation having a substantially square base and four substantially isosceles-triangular-shaped deflecting faces 46, each of which slopes into the substrate, at angle theta (not shown), toward an apex 52. Deflecting faces 46 may deflect a portion of the light beam toward all four perimeter faces 45, 48, 50, and 52. For example, an optical detector may be disposed at each of the perimeter faces, and deflecting faces 46 may deflect a portion of the light beam toward all of the detectors.

The length L and/or width W of each of deflectors 42 is typically at least 10 and/or less than 200 micrometers, e.g., between 10 and 200 micrometers. (In the context of the present claims and description, L and W refer, respectively, to the length and width of the opening in the outer surface of the first face that defines the base of the indentation. For pyramid-shaped indentations, L is approximately equal to W.)

In some embodiments, to increase the amount of deflected light that is detected, a relatively large portion (e.g., more than 20%, 50%, or 80%) of each of one or more of the perimeter faces of the substrate is "covered" by a detector. Such "cover" may be provided by increasing the total surface area of the detectors, such as by (i) providing multiple detectors along each of the one or more perimeter faces, and/or (ii) increasing the length L2 of each of the detectors, relative to the length L2 shown in FIG. 2. Such embodiments may be combined with any of the types of indentations shown in FIG. 3, but are particularly suited for indentations 43B and 43C, each of which has multiple deflecting faces 46. If only a relatively small portion of each perimeter face were covered by a detector, it would be difficult to orient indentations 43B or 43C such as to allow a relatively large portion of light deflected from each of the deflecting faces of each indentation to be detected. The increase in the number and/or length of the detectors, as described above, thus facilitates more effective use of indentations 43B and 43C.

Referring to FIG. 2, in some embodiments, the size of each deflector is generally a function of the distance of the deflector from the detector, such that a deflector 42B that is farther from the detector than a deflector 42A is larger, in at least one dimension, than deflector 42A. For example, a length L1 of deflector 42B may be greater than a length L0 of deflector 42A. (Alternatively or additionally, height H1 of deflector 42B may be greater than height H0 of deflector 42A, and/or width W1 of deflector 42B may be greater than width W0 of deflector 42A.) The larger size of deflector 42B, relative to deflector 42A, allows for portion 34 of the light beam that is deflected by deflector 42B to have a greater intensity than the portion that is deflected by deflector 42A. (Thus, the arrow "34" emanating from deflector 42B is drawn longer than the arrow "34" emanating from deflector 42A.) This compensates for the additional attenuation experienced by the deflected portion 34 of the light beam as it travels the longer distance to detector 30.

Alternatively or additionally, the deflectors may be non-uniformly distributed, such that the deflectors are distributed more densely in areas that are farther from the detector (e.g., the area near deflector 42B) than in areas that are closer to the detector (e.g., the area near deflector 42A). The greater density of deflectors in the farther area compensates for the additional attenuation experienced by the deflected portion 34 of the light beam as it travels the longer distance to detector 30.

In some embodiments, as shown in FIG. 2, the substrate is shaped to define a flat plate. (In the context of the present description and claims, the term "flat" refers to lack of curvature, as would be exhibited, for example, in a lens.)

In other embodiments, the substrate is shaped to define a lens. In these latter embodiments, in addition to testing the diffraction of beam 24, the substrate may help focus the beam, to further facilitate the 3D mapping. In some embodiments, first face 40 has a plurality of optical deflectors (e.g., prisms) embedded therein, alternatively or additionally to being shaped to define indentations 43.

In some embodiments, the substrate is used as the cover window of the optical apparatus.

Reference is now made to the enlarged portion of FIG. 1. In this portion of FIG. 1, DOE 26 is shown as having a defective portion 31, which does not diffract the portion 24B of light beam 24 that passes through it. As a result, portion 34B of the light beam, which is deflected by a deflector 42D toward detector 30, has a relatively large intensity. In contrast, portion 24A of the light beam, which passes through a non-defective portion 33 of the DOE, is diffracted properly, such that portion 34a of the light beam, which is deflected by a deflector 42C toward the detector, has a smaller intensity.

The total amount of light that is deflected by the deflectors is the sum of the contributions of the individual deflectors. Thus, if the DOE is generally non-defective, the detector will detect a relatively small amount of light. In such a situation, output 38, generated by the processor, may indicate that the light beam is sufficiently expanded; alternatively, output 38 may not be generated at all. On the other hand, if the DOE is even slightly defective, the detector will detect a larger amount of light than usual. In such a situation, as noted above, the processor generates output 38 indicating that the light beam is insufficiently expanded, and/or inhibits operation of the light source.

Embodiments described herein include methods for manufacturing apparatus 20, in which techniques such as injection molding, compression molding, replication, patterning, and/or etching may be used to create indentations 43.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. An apparatus, comprising:
 a transparent substrate, a first face of the substrate being shaped to define a plurality of optical deflectors; and
 at least one optical detector positioned to face a second face of the substrate that is not opposite the first face, each one of the deflectors being configured to deflect a portion of a light beam, which is emitted through the substrate by a light source, toward the detector, upon the light beam passing through the first face of the substrate.

2. The apparatus according to claim 1, wherein the optical detector is coupled to the second face of the substrate.

3. The apparatus according to claim 1, wherein the first face of the substrate is shaped to define the plurality of optical deflectors by being shaped to define a plurality of prism-shaped indentations.

4. The apparatus according to claim 1, wherein the first face of the substrate is shaped to define the plurality of optical deflectors by being shaped to define a plurality of pyramid-shaped indentations.

5. The apparatus according to claim 1, further comprising the light source.

6. The apparatus according to claim 1, wherein the substrate is shaped to define a flat plate.

7. The apparatus according to claim 1, wherein the substrate is shaped to define a lens.

8. The apparatus according to claim 1, wherein a third face of the substrate that is opposite the first face is shaped to define a diffractive optical element.

9. The apparatus according to claim 1, wherein a third face of the substrate that is opposite the first face is a light-diffusing face.

10. The apparatus according to claim 1, further comprising a diffractive optical element (DOE), wherein a third face of the substrate that is opposite the first face is coupled to the DOE.

11. The apparatus according to claim 1, wherein a first one of the deflectors is (i) farther from the detector than a second one of the deflectors, and (ii) larger than the second one of the deflectors.

12. The apparatus according to claim 1, wherein a first area of the first face is farther from the detector than a second area of the first face, and wherein the deflectors are distributed more densely in the first area than in the second area.

13. The apparatus according to claim 1, wherein a length of each of the deflectors is between 10 and 200 micrometers.

14. The apparatus according to claim 1, wherein the optical detector is configured to generate a signal in response to detecting the deflected portion of the light beam, and wherein the apparatus further comprises a processor configured to:
 receive the signal, and
 in response to the signal, generate an output that is indicative of an angular spread of the light beam.

15. The apparatus according to claim 14, wherein the processor is further configured to, in response to a magnitude of the signal exceeding a threshold, inhibit operation of the light source.

16. A method, comprising:
 using a light source, emitting a light beam through a transparent substrate that includes a first face shaped to define a plurality of optical deflectors, such that, upon the light beam passing through the first face of the substrate, a portion of the light beam is deflected by the deflectors toward an optical detector positioned to face a second face of the substrate that is not opposite the first face;

using the optical detector, detecting the deflected portion of the light beam, and generating a signal in response thereto; and using a processor, receiving the signal, and in response to the signal, generating an output that is indicative of an angular spread of the light beam.

17. The method according to claim 16, further comprising using the processor to inhibit operation of the light source, in response to a magnitude of the signal exceeding a threshold.

18. A method for use with a transparent substrate having (i) a first face, and (ii) a second face that is not opposite the first face, the method comprising:

positioning an optical detector to face the second face of the substrate; and shaping the first face of the substrate to define a plurality of optical deflectors, each one of the deflectors being configured to deflect a portion of a light beam, which is emitted through the substrate by a light source, toward the detector, upon the light beam passing through the first face of the substrate.

19. The method according to claim 18, wherein shaping the first face of the substrate to define the plurality of optical deflectors comprises shaping the first face of the substrate to define a plurality of prism-shaped indentations.

20. The method according to claim 18, wherein shaping the first face of the substrate to define the plurality of optical deflectors comprises shaping the first face of the substrate to define a first deflector and a second deflector, the first deflector being (i) farther from the detector than the second deflector, and (ii) larger than the second deflector.

* * * * *